No. 692,417. Patented Feb. 4, 1902.
A. BECKERS.
DREDGE OR GRAPPLE.
(Application filed Nov. 4, 1901.)
(No Model.) 3 Sheets—Sheet 1.
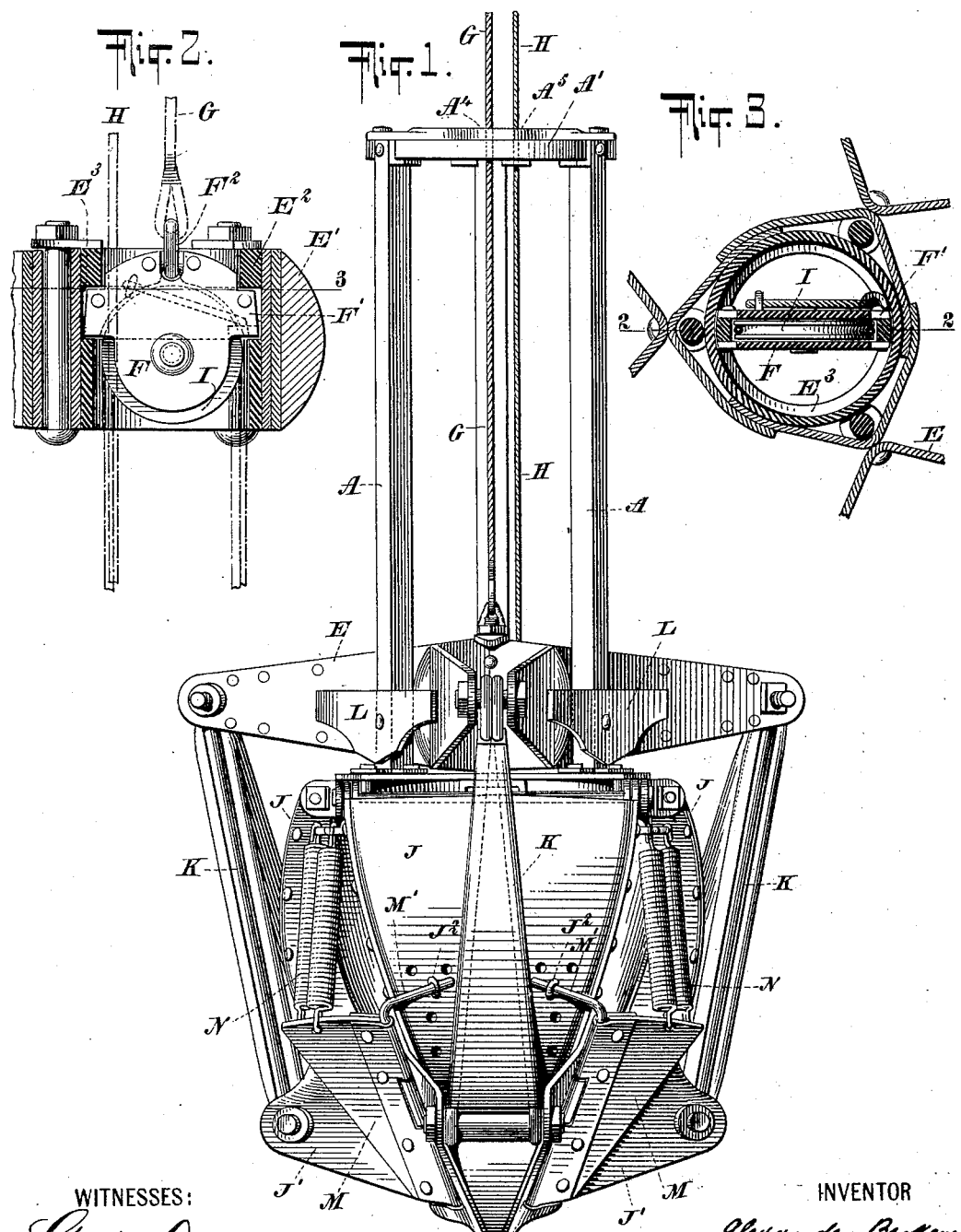
WITNESSES:
Gustave Dieterich
John Lotka
INVENTOR
Alexander Beckers
BY Briesen Knauth
his ATTORNEYS No. 692,417. Patented Feb. 4, 1902.
A. BECKERS.
DREDGE OR GRAPPLE.
(Application filed Nov. 4, 1901.)
(No Model.) 3 Sheets—Sheet 2.
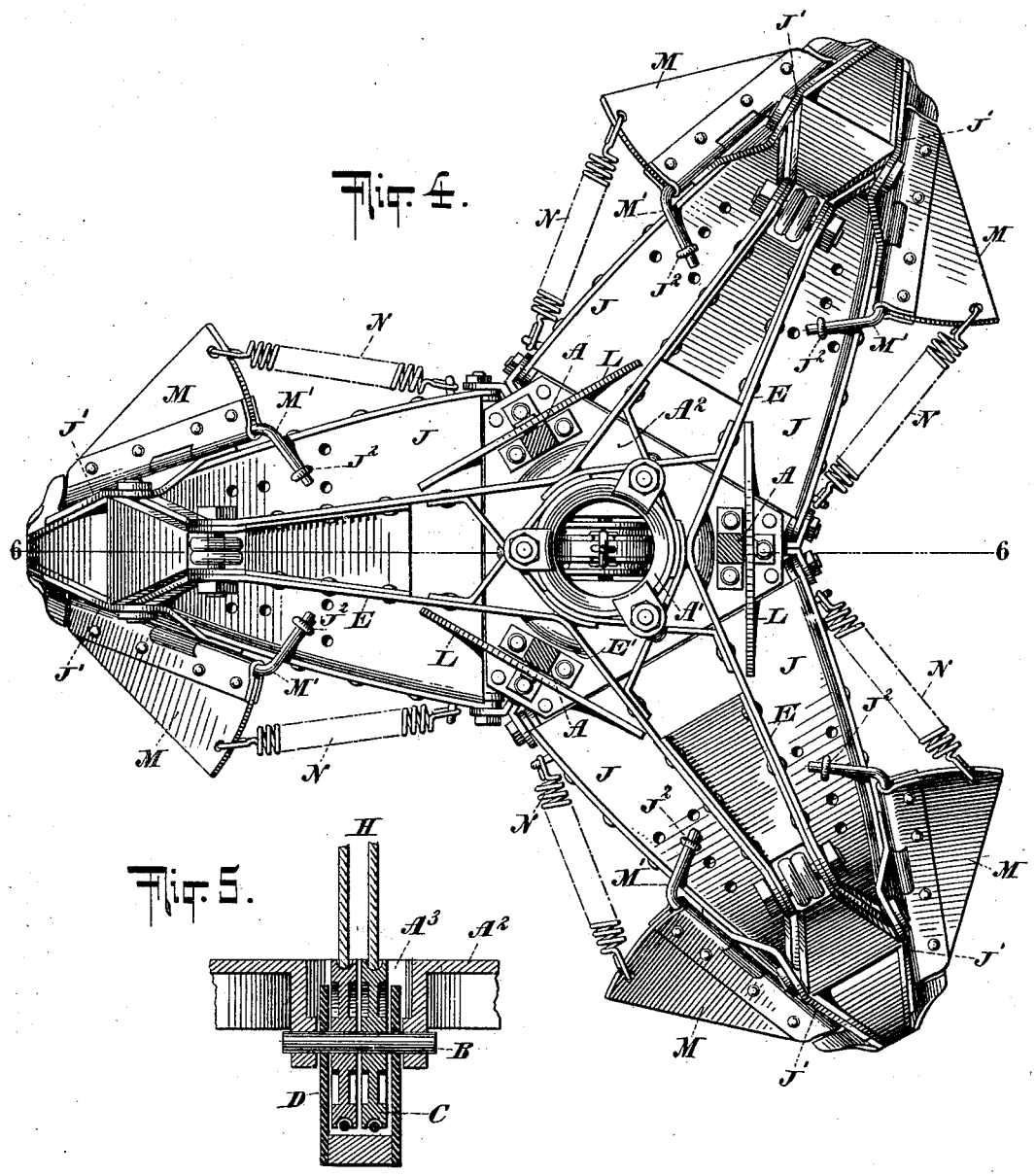
WITNESSES:
INVENTOR
Alexander Beckers
BY Briesen & Knauth
his ATTORNEYS

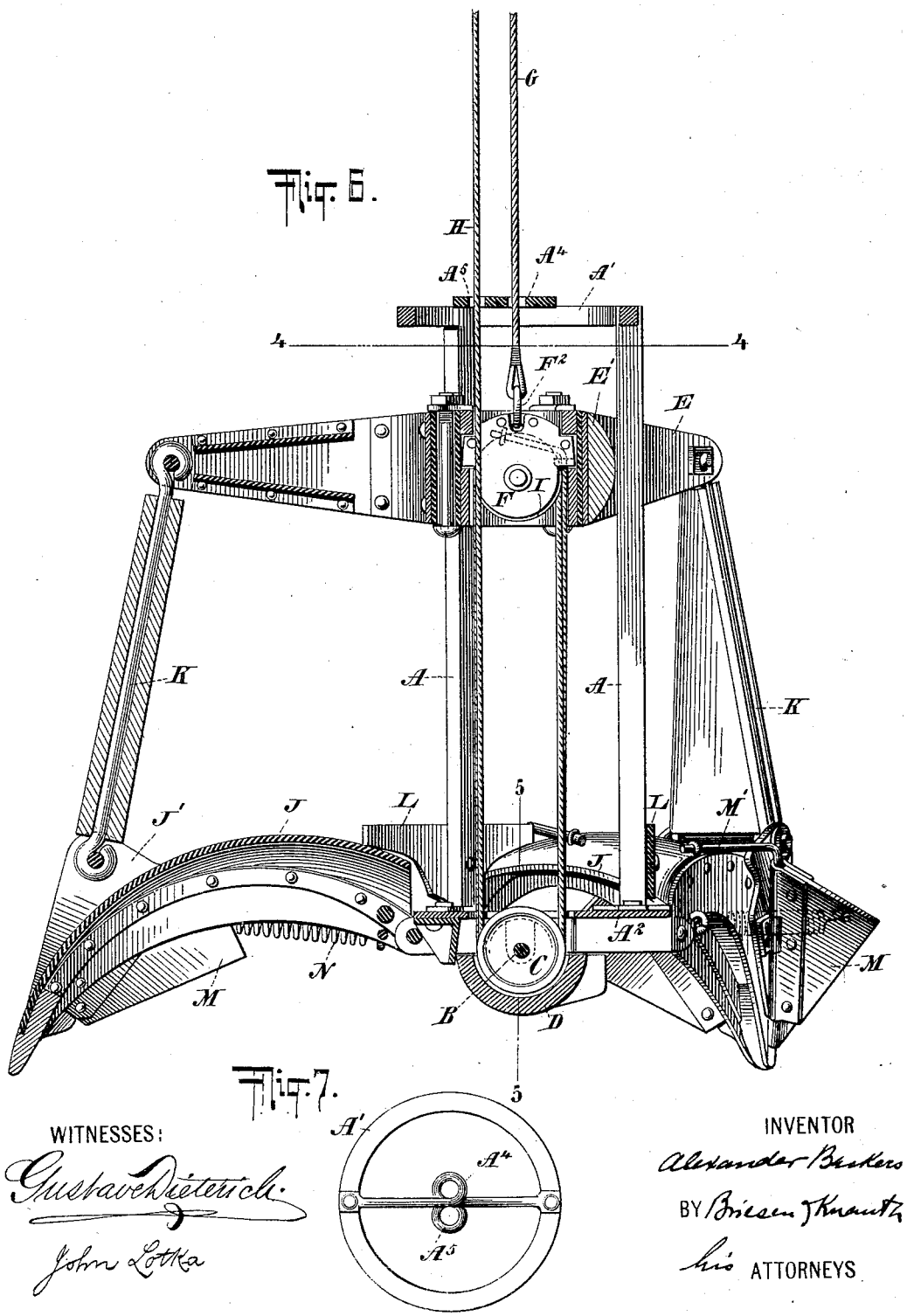

United States Patent Office.

ALEXANDER BECKERS, OF HOBOKEN, NEW JERSEY.

DREDGE OR GRAPPLE.

SPECIFICATION forming part of Letters Patent No. 692,417, dated February 4, 1902.

Application filed November 4, 1901. Serial No. 80,984. (No model.)

*To all whom it may concern:*

Be it known that I, ALEXANDER BECKERS, a citizen of the United States, and a resident of Hoboken, Hudson county, State of New Jersey, have invented certain new and useful Improvements in Dredges or Grapples, of which the following is a specification.

My invention relates to so-called "grapples" for grasping and raising or lowering masses of solid matter, such as sand or stones, and particularly to that class of devices which are used for raising such solid substances from under water.

The object of my present invention is to improve devices of the above-indicated class by providing self-adjusting stops on the blades which hold the material to be raised, by adding to the said blades wings which are preferably yielding, so as to avoid injury to the blades in case of contact with an obstruction too large to allow the blades to close, by a peculiar angular arrangement of the tackle which receives the hoisting-rope, and by a novel manner of guiding the ropes used in hoisting and lowering the device.

The invention will now be fully described, and its novel features will then be pointed out in the appended claims.

Reference is to be had to the accompanying drawings, in which—

Figure 1 is a side elevation of a grapple constructed according to my invention. Fig. 2 is a detailed sectional elevation of the tackle on line 2 2 of Fig. 3. Fig. 3 is a sectional plan of the tackle on line 3 3 of Fig. 2. Fig. 4 is a plan view of the grapple with parts in section on line 4 4 of Fig. 6. Fig. 5 is a detailed sectional elevation on line 5 5 of Fig. 6. Fig. 6 is a sectional elevation of the grapple on line 6 6 of Fig. 4.

The improved grapple, briefly described, comprises the following parts: A frame having blades pivoted to its lower end, a tripod or carrier mounted to move up and down on said frame and connected by links with the said blades, wings connected with the sides of the blades, stops on the frame for limiting the opening movement of the blades, and tackles located at the lower part of the frame and in the tripod and adapted to receive the hoisting and lowering ropes or cables.

In detail the grapple is constructed as follows:

The frame has in the construction shown three upright bars A, connected at their upper ends by a ring A', while their lower ends are secured to a plate A². At the center of this plate is located a recess A³, within which is supported an axle B, upon which are journaled side by side and independently two pulleys C, forming the lower tackle. If desired, these pulleys may be protected by a casing D, secured to the plate A².

Upon the rods or bars A is adapted to move up and down a frame or tripod E, consisting, as shown, of three arms projected radially and provided with spherically-curved engaging portions E', adapted to move on the inner surfaces of the bars A. Thus the tripod or carrier E cannot only move up and down, but is also capable of assuming a more or less inclined position.

At the center of the carrier E, I provide a ring E², having an annular groove or recess E³, which is adapted to receive lugs F', projecting from the upper pulley-frame F. The lugs are somewhat smaller than the groove which receives them, so that they may form trunnions, as it were, for the pulley-frame, allowing said frame to remain vertical when the carrier F assumes an inclined position.

G is the lowering-rope, which is secured to a hook or eye F² of the pulley-frame F and extends upward therefrom and through an eye or guide A⁴, secured to the ring A'. The form of this guide is clearly shown in Fig. 7, where it will be seen that the guide consists of a single piece of metal formed into two loops, one of which, A⁴, is at the center of the ring, while the other, A⁵, is to one side of the center and in substantial alinement with the periphery of one of the lower pulleys C. The hoisting-rope H passes through the guide A⁵ and the ring E² down to an engagement with one of the lower pulleys C, then up over the upper pulley I, journaled in the frame F, then down around the other lower pulley C, and up again to the pulley-frame F, to which it is fastened. By the arrangement of the upper pulley within the carrier or tripod E, I am enabled to have a double run of the hoisting-rope between the carrier and the lower end of the frame.

The plate A² is triangular in the construction shown, and along its edges are pivoted three blades or scoops J, which may be solid or perforated. These scoops are curved and pointed at their outer ends, these ends being arranged to abut against each other when the grapple is in the closed position shown in Fig. 1. Adjacent to the ends of the blades are provided lugs J', with which are pivotally connected links K, the upper ends of which are pivoted to the outer ends of the arms of the carrier E. In order to limit the opening movement of the blades, I pivot to each of the bars A a stop-arm L, projecting to each side of said bar and adapted to engage two of the blades J, as clearly shown in Figs. 4 and 6. By pivoting this stop I equalize the strain which comes upon it.

Along the edges of the blades J, adjacent to their outer ends or points, I pivot wings M, which may be connected with said blades by means of hinges, the pintles M' of which may be secured by means of eyes J² on the blades. These wings M are held normally in the position illustrated by Fig. 4, this being effected by means of springs N, connected with the wings and with the blades or with the plate A², it being understood that an inward or closing movement of the wings is opposed by the fact that the springs N are expansion-springs and are practically incapable of being compressed. The wings M are so arranged that when the dredge or bucket is in the closed position shown in Fig. 1 the outer edges of the wings on adjacent blades J abut against each other. The wings can be easily attached and readily removed by unhooking one end of the spring N and withdrawing the pintle M'.

The operation of my improved grapple or dredge-bucket is substantially the usual one. In lowering the bucket the weight thereof is carried by the rope G, so that the slide or carrier E moves into the upper position, (shown in Fig. 6,) causing the blades and wings to open. When the bucket has been lowered into contact with the material or object to be grappled or raised, an upward pull is exerted on the hoisting-rope H, and this causes the plate A² to be raised relatively to the slide or carrier E and the blades J to be closed in the usual manner. Should any obstruction, such as a large stone, lodge between the wings M of adjacent blades, one of such wings, or both, will yield, thereby preventing breakage of said wings. It will be understood that the springs N allow for such movement. As the wings M do not extend the entire length of the blades J, water, mud, and a certain amount of sand will escape over the upper edges of said wings, while comparatively large articles will be held between the upper portions of the blades. The perforations of the blades will also assist in allowing most of the water to escape. As the upward pull on the hoisting-rope H continues the entire bucket will be raised in the usual manner, with its contents. In lowering the bucket as the blades J open they will come in contact with the equalizing stop-arms L, and thus an even strain will be exerted on the said arms, which is of importance when the bottom of the river or other body of water on which the dredge is working is not level.

By arranging the upper pulley-block within the carrier or slide E, I am enabled to employ a double or multiple lower pulley-block, and thus to secure a more powerful action.

Having described my invention, what I claim, and desire to secure by Letters Patent, is—

1. A dredge-bucket or grapple comprising a body, blades pivoted to said body, a slide or carrier movable relatively to the body and connected with the blades at a distance from their pivots, and wings pivoted to the said blades.

2. A dredge-bucket or grapple comprising a body, blades movably connected therewith and arranged to open and close, a slide or carrier movable relatively to the body and operatively connected with the blades, and wings pivoted to said blades.

3. A dredge-bucket or grapple comprising blades mounted to open and close, means for effecting the opening and closing movement of said blades, and wings pivoted to said blades.

4. A dredge-bucket or grapple comprising blades mounted to open and close, mechanism for opening and closing the blades and wings pivoted to the side edges of said blades.

5. A dredge-bucket or grapple comprising blades mounted to open and close, means for opening and closing the blades, and wings pivoted to the side edges of the blades and extending from the outer ends or points of said blades toward the pivot ends thereof and terminating short of said pivot ends.

6. A dredge-bucket or grapple comprising blades mounted to open and close, means for effecting an opening and closing movement of said blades, and spring-pressed wings pivoted to the sides of said blades, the free edges of the wings of adjacent blades being adapted to engage each other in the closed position of the grapple or dredge-bucket.

7. A dredge-bucket or grapple comprising blades mounted to open and close, means for opening and closing the blades, and spring-pressed wings pivotally attached to the said blades along the side edges thereof.

8. A dredge-bucket or grapple comprising a body, blades pivoted thereto, means for opening and closing the blades, and stops pivoted to the body and adapted to be engaged by adjacent blades on opposite sides of the stop-pivot when the blades open.

9. A dredge-bucket or grapple comprising a body with the blades pivoted thereto, a carrier movable relatively to the body and operatively connected with the blades, a pulley-block at the lower portion of the body, another pulley-block having a swivel connection with the carrier, a lowering-rope connected with the second-named pulley-block, and a hoisting-rope engaged with the pulleys of both blocks.

10. A dredge-bucket or grapple comprising a body, blades pivoted thereto, a carrier movable relatively to said body and operatively connected with said blades, a pulley-block on the lower portion of the body, another pulley-block having a swivel connection with the carrier to turn in a substantially horizontal plane and also capable of swinging relatively thereto on a substantially horizontal axis, a lowering-rope connected with the pulley-block of the carrier, and a hoisting-rope engaged with the pulleys of both blocks.

11. A dredge-bucket or grapple comprising a body having upright spaced bars connected at the top and at the bottom, blades pivoted to the lower portion of the body, a carrier movable along the said bars and operatively connected with the said blades, a pulley-block on the body, a lowering-rope connected with the carrier, a hoisting-rope engaged with the pulley of said block, and a guide for the said ropes, the said guide being located at the upper ends of the body-bars.

ALEXANDER BECKERS.

Witnesses:
JOHN LOTKA,
HENRY M. TURK.